(12) United States Patent
Park et al.

(10) Patent No.: US 9,485,612 B2
(45) Date of Patent: Nov. 1, 2016

(54) METHOD AND APPARATUS FOR PEER-TO-PEER SERVICE IN WIRELESS COMMUNICATION SYSTEM

(75) Inventors: Jung-Shin Park, Seoul (KR); Jung-Je Son, Yongin-si (KR); Ji-Cheol Lee, Suwon-si (KR); Se-Hoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/397,642

(22) Filed: Feb. 15, 2012

(65) Prior Publication Data

US 2012/0208571 A1    Aug. 16, 2012

(30) Foreign Application Priority Data

Feb. 15, 2011   (KR) .................. 10-2011-0013153
Feb. 15, 2012   (KR) .................. 10-2012-0015145

(51) Int. Cl.
*H04W 4/00* (2009.01)
*H04W 4/02* (2009.01)
*H04L 29/08* (2006.01)

(52) U.S. Cl.
CPC .............. *H04W 4/02* (2013.01); *H04L 67/101* (2013.01); *H04L 67/1021* (2013.01); *H04L 67/1063* (2013.01)

(58) Field of Classification Search
CPC .................................. H04W 4/14; H04W 4/12
USPC .................. 455/466, 463, 448, 517; 370/338
See application file for complete search history.

(56) References Cited

U.S. PATENT DOCUMENTS

| | | | |
|---|---|---|---|
| 5,903,618 A * | 5/1999 | Miyake et al. | 375/356 |
| 8,285,207 B2 | 10/2012 | Kwon et al. | |
| 8,406,206 B2 | 3/2013 | Chiang | |
| 8,553,596 B1 * | 10/2013 | Vivanco | H04W 48/18 370/252 |
| 2003/0009587 A1* | 1/2003 | Harrow et al. | 709/238 |
| 2005/0128968 A1 | 6/2005 | Yang | |
| 2005/0185624 A1* | 8/2005 | Andersen et al. | 370/338 |
| 2007/0275696 A1* | 11/2007 | Cheng et al. | 455/412.1 |
| 2009/0017855 A1 | 1/2009 | Kwon et al. | |
| 2009/0234918 A1* | 9/2009 | Neumann et al. | 709/204 |
| 2010/0215024 A1* | 8/2010 | Chiang | 370/338 |
| 2014/0105117 A1 | 4/2014 | Kwon et al. | |

FOREIGN PATENT DOCUMENTS

| | | |
|---|---|---|
| CN | 1657299 A | 8/2005 |
| CN | 101689917 A | 3/2010 |

OTHER PUBLICATIONS

International Search Report dated Sep. 27, 2012 in connection with International Patent Application No. PCT/KR2012/001128.

(Continued)

*Primary Examiner* — Chuck Huynh

(57) ABSTRACT

A method and an apparatus for providing a Peer-to-Peer (P2P) service in a wireless communication system. A method of a server for providing the P2P service includes receiving a P2P service request signal comprising information of contents desired by a particular Mobile Station (MS); selecting at least one MS from MSs having the contents; establishing a traffic path between the particular and the selected MS; and transmitting information of the selected MS to the particular MS.

22 Claims, 14 Drawing Sheets

(56) References Cited

OTHER PUBLICATIONS

Written Opinion of the International Searching Authority dated Sep. 27, 2012 in connection with International Patent Application No. PCT/KR2012/001128.
T. Schwotzer, "A Mobile Spontaneous Semantic P2P System", 2009 IEEE International Conference on Communications Technology and Applications, pp. 977-981, Oct. 18, 2009.
A. Berl, et al., "Integration of Mobile Devices into Popular Peer-to-Peer Networks", 2009 Next Generation Internet Networks (NGI '09), pp. 1-9, Jul. 3, 2009.
Extended European Search Report dated Sep. 15, 2014 in connection with European Patent Application No. 12746942.7; 7 pages.
Text of the First Office Action dated Jul. 1, 2015 in connection with Chinese Patent Application No. 2012-80018516.8; 34 pages.
European Office Action issued for EP 12746942.7 dated Mar. 22, 2016, 8 pgs.

\* cited by examiner

METHOD AND APPARATUS FOR PEER-TO-PEER SERVICE IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Feb. 15, 2011, and assigned Serial No. 10-2011-0013153 and a Korean patent application filed in the Korean Intellectual Property Office on Feb. 15, 2012 and assigned Serial No. 10-2012-0015145, the entire disclosure of which are hereby incorporated by reference.

TECHNICAL FIELD OF THE INVENTION

The present disclosure relates generally to a wireless communication system. More particularly, the present disclosure relates to a method and an apparatus for providing a Peer-to-Peer (P2P) service.

BACKGROUND OF THE INVENTION

Recently, as the use of intelligent mobile terminals which generate massive traffic, such as smart phones and table Personal Computers (PCs), is rapidly increasing, excessive traffic occurs throughput a wireless communication network and a service is not provided occasionally in the wireless communication network.

Most of the traffics generated by the intelligent mobile terminals such as smart phones and table PCs are related to a small number of specific services. That is, most of the traffics caused by the intelligent mobile terminals in the network involve the communication with a server for the particular services. Hence, although most of the traffics are caused by different mobile terminals, it is highly likely that the traffics are to receive the same information.

To address network congestion and out-of-service due to the traffic generated by the intelligent mobile terminal, the related art takes account of such a traffic property and discusses Peer-to-Peer (P2) introduction allowing the mobile terminal to receive the mobile terminal's intended information from a neighboring mobile terminal.

Typically, in a P2P service in a wired network, the terminal requests the P2P service of particular information to a P2P server, receives a list of terminals having the particular information from the P2P server, selects one or more terminals in the list, and receives the particular information from the selected terminal. However, this service is suggested based on the wired network and does not consider characteristics of the wireless environment such as inter-cell interference and resource limitation. Hence, it is difficult to apply this service to the wired network as it is.

That is, it is necessary to provide a method for efficiently performing the P2P service between the terminals in the wireless communication system.

SUMMARY OF THE INVENTION

To address the above-discussed deficiencies of the prior art, it is a primary aspect of the present disclosure to provide a method and an apparatus for providing a Peer-to-Peer (P2P) service in a wireless communication system.

Another aspect of the present disclosure is to provide a method and an apparatus for selecting a P2P peer MS for a MS which requests a P2P service in a wireless communication system.

Yet another aspect of the present disclosure is to provide a method and an apparatus for establishing and managing a traffic path based on locations of P2P service MSs in a wireless communication system.

Still another aspect of the present disclosure is to provide a method and an apparatus of an MS for requesting a P2P service in a wireless communication system.

A further aspect of the present disclosure is to provide a method and an apparatus for collecting information of MSs for providing a P2P service according to a location of an MS requesting the P2P service in a wireless communication system.

According to one aspect of the present disclosure, a method of a server for providing a P2P service in a wireless communication system includes receiving a P2P service request signal comprising information of contents desired by a particular Mobile Station (MS); selecting at least one MS from MSs having the contents; establishing a traffic path between the particular and the selected MS; and transmitting information of the selected MS to the particular MS.

According to another aspect of the present disclosure, a method of an MS for receiving a P2P service in a wireless communication system includes transmitting a P2P service request signal comprising information of contents to a server; receiving information of a peer MS capable of providing the contents from the server; requesting the peer MS to provide contents; and receiving the contents from the peer MS in a traffic path established by the server.

According to yet another aspect of the present disclosure, a method of a gateway for providing a P2P service in a wireless communication system includes receiving a request for a list of MSs enabling a P2P service with a particular MS, from a server; identifying a serving Base Station (BS) of the particular MS; collecting information of a P2P service donor MS which accesses the serving BS and at least one neighboring BS of the serving BS; and transmitting a candidate MS list comprising the collected MS information to the server.

According to still another aspect of the present disclosure, a method of a BS for providing a P2P service in a wireless communication system includes receiving a request for a list of MSs enabling a P2P service with a particular MS, from a gateway; collecting information of a P2P service donor MS among MSs accessing the BS; and transmitting a candidate MS list comprising the collected MS information to the gateway.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a method and an apparatus for providing a Peer-to-Peer (P2P) service in a wireless communication system. Hereinafter, the present disclosure shall use, but not limited to, terms defined in Institute of Electrical and Electronics Engineers (IEEE) 802.16m standard to ease the understanding. Yet, the present disclosure can adopt other standard systems.

Figure 1:
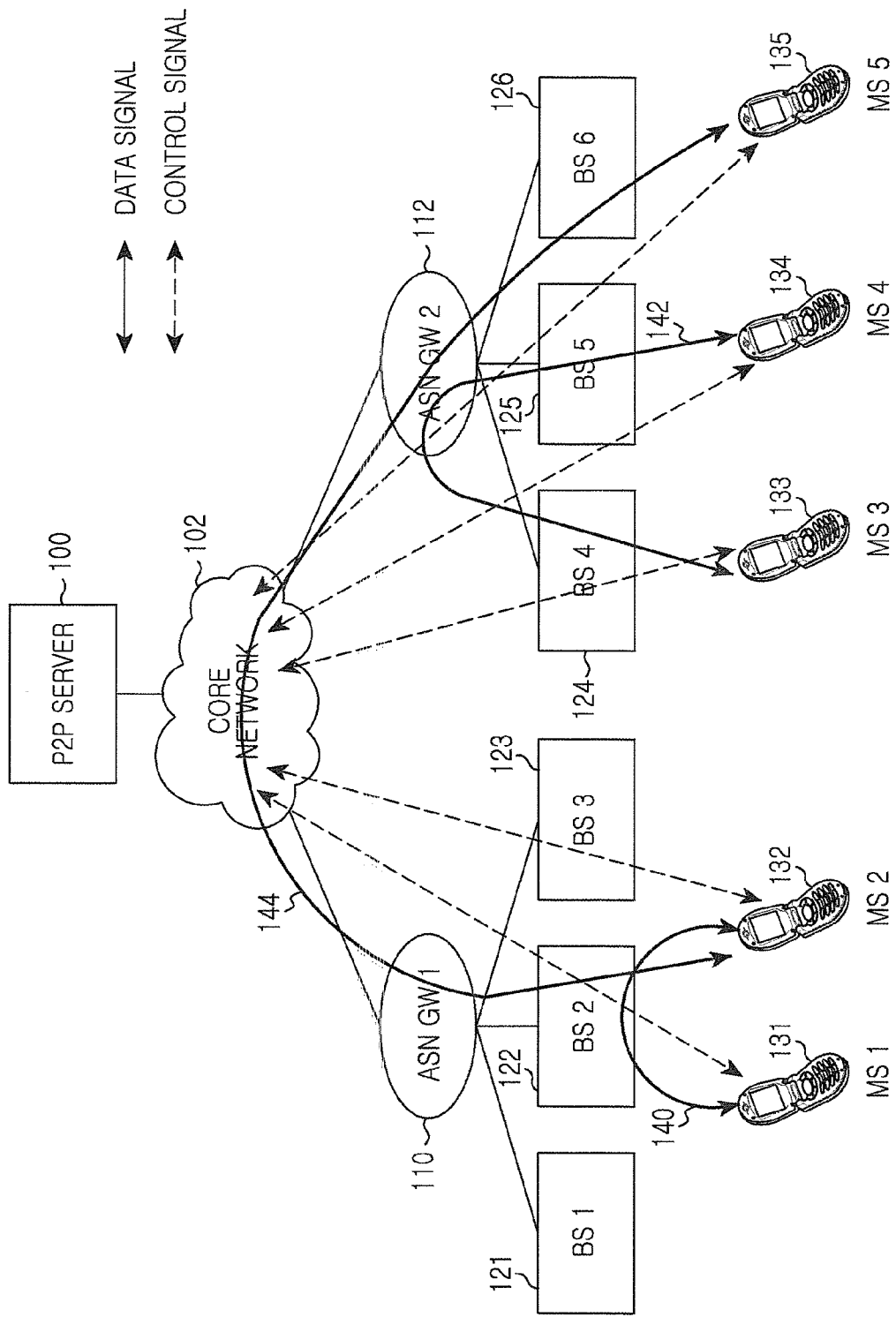
FIG. 1 illustrates a method for providing a P2P service in a wireless communication system according to an exemplary embodiment of the present disclosure.

FIG. 1 illustrates a method for providing a P2P service in a wireless communication system according to an exemplary embodiment of the present disclosure.

Referring to FIG. 1, the wireless communication system includes a P2P server 100, a core network 102, a plurality of Access Service Network GateWay (ASN-GWs) 110 and 112, a plurality of Base Stations (BSs) 121 through 126, and a plurality of Mobile Stations (MSs) 131 and 135.

The P2P server 100 provides a P2P service between MSs, and includes a database containing a list of MSs registered to the P2P service and information of the MSs. The P2P server 100 selects a P2P donor MS for the P2P service request MS, and establishes and manages a traffic path between the P2P request MS and the P2P donor MS. That is, when a particular MS requests the P2P service, the P2P server 100 requests the ASN-GW 110 or 112 forwarding the P2P service request signal to transmit a P2P donor candidate MS list, and receives resource status information of the P2P donor candidate MSs and corresponding BSs from the ASN-GW 110 or 112. The P2P server 100 selects the P2P donor MS by considering information of intended contents of the P2P service request MS, the P2P service registered MS, the received P2P donor candidate MS, and the resource status information of the corresponding BSs. Upon selecting the P2P donor MS, the P2P server 100 establishes the P2P traffic path according to a relative location between the P2P request MS and the P2P donor MS, and requests the ASN- GW or the BS corresponding to the P2P traffic path to establish the traffic path between the P2P request MS and the P2P donor MS. The P2P server 100 transmits information (e.g., Internet Protocol (IP)) of the P2P donor MS to the P2P request MS. Next, when receiving a signal indicating the P2P service completion from the P2P request MS, the P2P server 100 updates the information of the P2P request MS in the database and requests the corresponding ASN-GW or BS establishing the traffic path to delete the traffic path. Herein, when the P2P service complete signal received from the P2P request MS indicates the abnormal completion, the P2P server 100 functions to reselect the P2P donor MS.

The ASN-GWs 110 and 112 control the BSs 121 through 126, interconnect the BSs 121 through 126 with a core network, and route data flows between the data core network and the BSs 121 through 126. The ASN-GWs 110 and 112, as BS controllers, may function as a paging controller, an authenticator, and a Data Path Function (DPF). In particular, the ASN-GWs 110 and 112 are requested by the P2P server 100 to transmit the list of the P2P donor candidate MSs, collect the information of the MSs capable of providing the P2P service to the P2P request MS according to the request by identifying a serving BS to which the P2P request MS is accessing and a neighboring BS, and provide the P2P donor candidate MS list including the MSs of the collected information to the P2P server 100. Herein, according to the design, the ASN-GWs 110 and 112 can repeatedly collect the information of the MSs for providing the P2P service to the P2P request MS, generate their list, and provide the list to the P2P server 100 on the periodic basis.

When receiving from the P2P server 100 or the BS 121 through 126 a signal requesting to establish the traffic path for a particular MS, the ASN-GWs 110 and 112 store the traffic path for the corresponding MS. When receiving the traffic signal for the corresponding MS from the BS 121 through 126, the ASN-GWs 110 and 112 forward the traffic signal of the corresponding MS along the stored traffic path. For example, the first ASN-GW 110 receives from the P2P server 100 the signal requesting to forward the traffic signal from the second MS 132 to the ASN-GW 112 since the second MS 132 and the fifth MS 135 use the P2P service, and forwards the traffic signal from the second MS 132 to the ASN-GW 112 according to the request of the P2P server 100 in step 144. For example, the second ASN-GW 112 receives from the P2P server 100 a signal requesting to forward the traffic signals from the third MS 133 and the fourth MS 134, since the third MS 133 and the fourth MS 134 use the P2P service, to the corresponding BSs 124 and 124 via the ASN-GW 112, and forwards the traffic signal from the third MS 133 to the fifth BS 125 according to the request of the P2P server 100 in step 142.

When receiving a signal requesting to delete the traffic path for a particular MS from the P2P server 100, the ASN-GWs 110 and 112 delete the traffic path of the corresponding MS.

The BSs 121 through 126 communicate with the MS over a radio channel, forward the signals from the ASN-GWs 110 and 112 which are the higher node, to the MS, and forward the signal of the MS to the ASN-GWs 110 and 112. In particular, when receiving the signal requesting to establish the traffic path for a particular MS from the P2P server 100 via the ASN-GWs 110 and 112, the BSs 121 through 126 store the traffic path of the corresponding MS. When receiving the traffic signal from the corresponding MS, the BSs 121 through 126 forward the traffic signal in the traffic path. For example, the second BS 122 receives from the P2P server 100 a signal requesting to detour the traffic signals for the first MS 131 and the second MS 132 to the MSs 131 and 132 since the first MS 131 and the second MS 132 use the P2P service, and forwards the signal from the first MS 131 to the second MS 132 according to the request of the P2P server 100 without transmitting the signal to the ASN-GW 110 which is its higher node in step 140. When receiving the signal requesting to delete the traffic path for a particular MS from the P2P server 100, the BSs 121 through 126 delete the traffic path of the corresponding MS. When a particular MS hands over during the P2P service, the serving BS of the particular MS transmits traffic path information of the particular MS to a handover target BS. The target BS sets the traffic path for the particular MS based on the received traffic path information. In so doing, the target BS can confirm information of the P2P peer MS for the particular MS based on the traffic path information, determine whether the P2P peer MS travels in a cell coverage of the target BS, and establish the traffic path for the particular MS within the target BS or request the ASN-GW to establish the traffic path for the particular MS according to the determination result. For example, when the second MS 132 and the fifth MS 135 use the P2P service and the second MS 132 hands over from the second BS 122 to the fourth BS 124, the second BS 122 transmits P2P traffic path information of the second MS 132 and the fifth MS 135 to the fourth BS 124. The fourth BS 124 recognizes based on the received traffic path information that the second MS 132 is in the P2P service with the fifth MS 125 which travels outside the fourth BS's cell coverage, and requests the ASN-GW 112 to establish the traffic path for the P2P service between the second MS 132 and the fifth MS 135. The MSs 131 and 135, which are user equipments, conduct the wireless communication by accessing the BSs 121 through 126. If necessary, the MSs 131 through 135 transmit the signal requesting the P2P service to the P2P server 100 and receive the information (e.g., IP) of the P2P donor MS. The MSs 131 through 135 can request the P2P donor MS to provide the intended contents and receive the corresponding contents. When the P2P donor MS completes or rejects the information provision, the MSs 131 through 135 transmit to the P2P server 100 a P2P service complete signal indicating the successful completion or the completion error of the information provision.

Figure 2A:
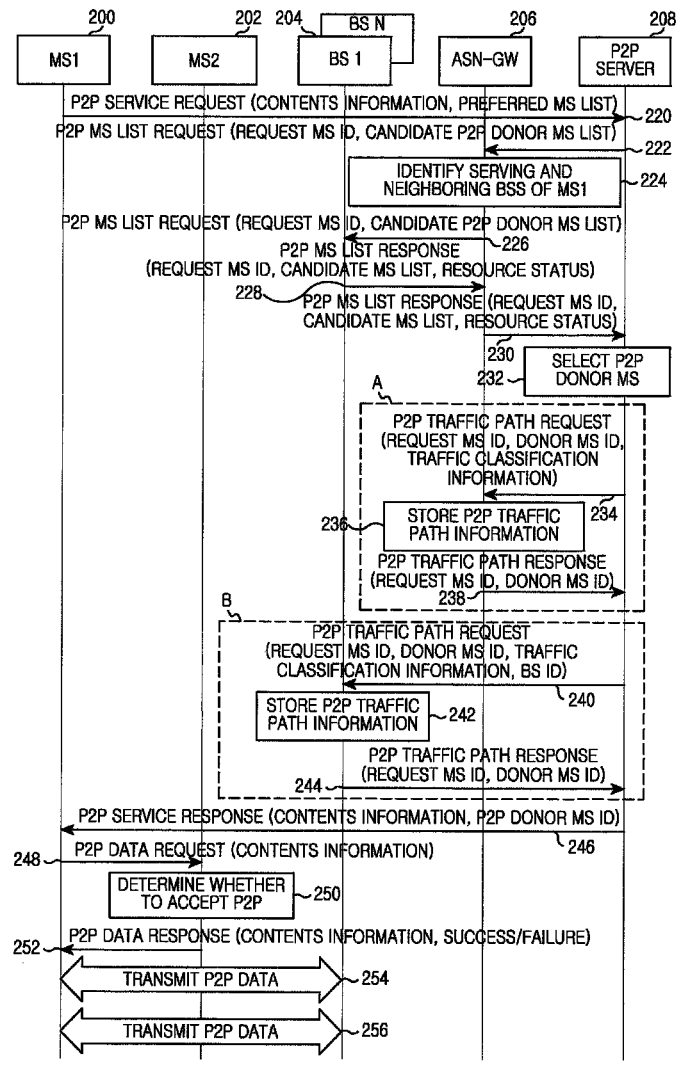
FIGS. 2A-C illustrate signal flows for providing the P2P service in the wireless communication system according to an exemplary embodiment of the present disclosure.
Figure 2B:
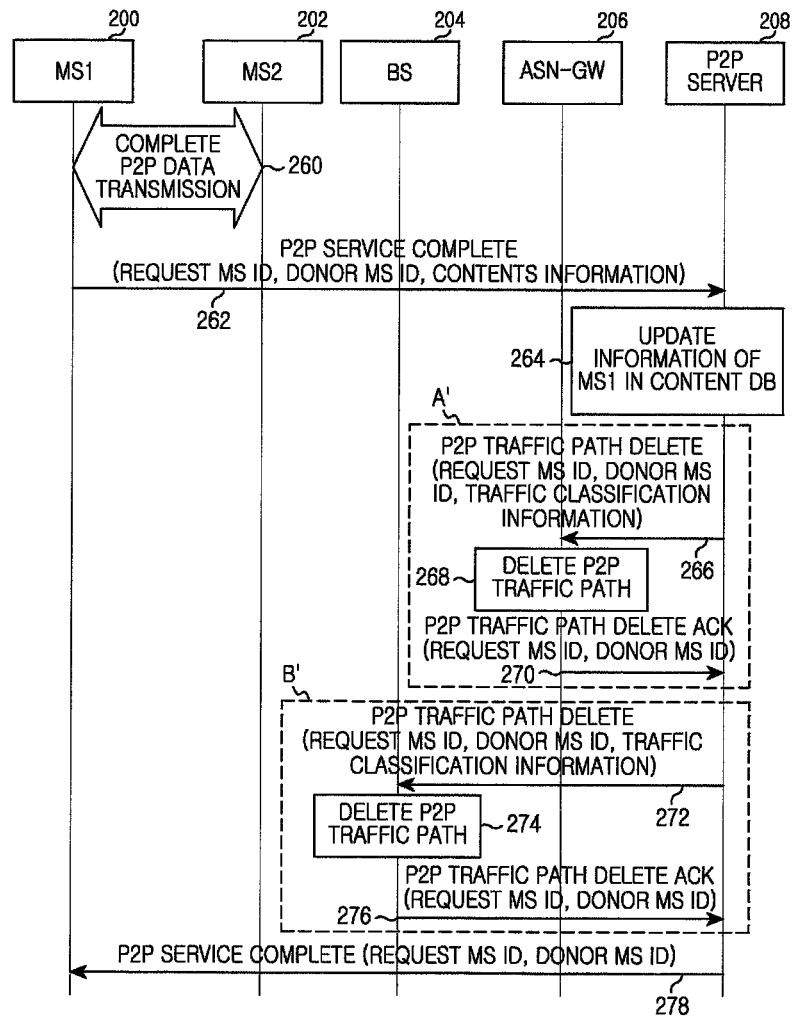
Figure 2C:
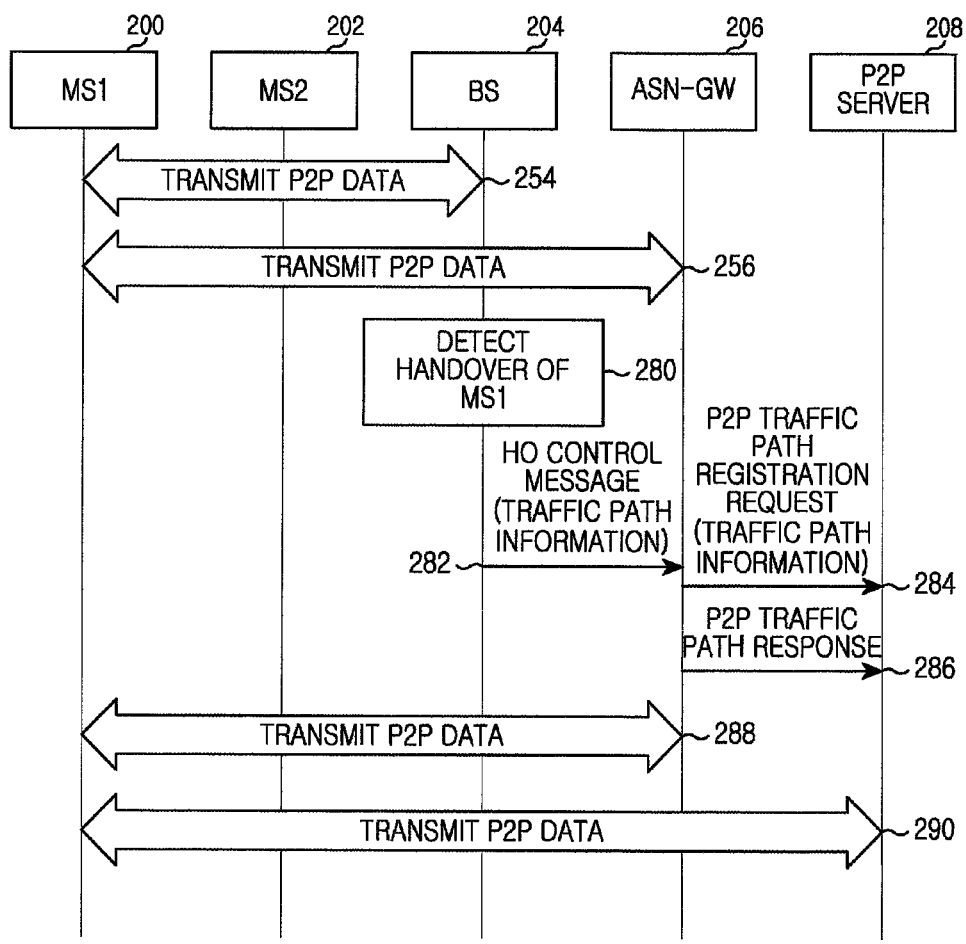

FIGS. 2A-C illustrate signal flows for providing the P2P service in the wireless communication system according to an exemplary embodiment of the present disclosure. Herein, it is assumed that a first MS 200 requests the P2P service and a second MS 202 is determined as a P2P service donor MS.

Referring to FIGS. 2A, 2B and 2C, when the first MS 200 determines that the P2P service is required to receive particular information, the first MS 200 transmits a P2P service request message requesting a P2P server 208 to inform of an MS capable of providing the MS's intended contents using the P2P service in step 220. The P2P service request message includes information of the contents desired by the MS, a P2P donor MS list preferred by the first MS 200, and ID of the first MS 200, and is transmitted as a control message of the higher layer. Notably, the P2P service request message may not include the P2P donor MS list preferred by the first MS 200 according to the P2P service request message's design. Herein, a BS 204 serving the first MS 100 and an ASN-GW 206 forward the P2P service request message to the P2P server 208 like a general data packet without separately processing it.

Next, to select the P2P donor MS for the first MS 200, the P2P server 208 transmits a message requesting information of MSs currently serviced; that is, a P2P MS list request control message to the ASN-GW 206 which forwards the P2P service request message in step 222. In so doing, the P2P MS list request message includes ID of the first MS 200 requesting the P2P service and a candidate P2P donor MS list. Herein, the P2P server 208 can generate the candidate P2P donor MS list by considering the preferred P2P donor MS list received from the P2P request MS, the information of the contents desired by the MS, an MS list having the contents among the MSs registered to the P2P server 208, and other provider policies. Notably, the P2P MS list request control message may not include the candidate P2P donor MS list according to the P2P MS list request control message's design. The P2P server 208 can request information of the ASN-GW 206 corresponding to the first MS 200 by transmitting at least one of the ID of the first MS 200 and the ID of the serving BS 204 of the first MS 200 to an Authentication Authorization Accounting (AAA), and obtain the information of the ASN-GW (e.g., IP information of the ASN-GW) of the first MS 200 from the AAA. In step 224, the ASN-GW 206 receiving the P2P MS list request control message searches for the ID of the BS 204 accessed by the first MS 200 based on the ID of the first MS 200 and identifies a neighboring BS of the first MS 200 in step 224. In step 226, the ASN-GW 206 forwards the P2P MS list request control message to the BS 204 accessed and the neighboring BS. Herein, the P2P MS list request message is sent to the neighboring BS of the first MS 200 in order to obtain the information of the candidate MSs traveling in the cell coverage closed to the first MS 200 and capable of actually providing the P2P service to the first MS 200 among the MSs of the candidate P2P donor MS list. In step 228, the serving BS 204 accessed by the first MS 200 compares the candidate P2P donor MS list and the serving BS's 204 served MS list, generates the candidate MS list by selecting MSs of the candidate P2P donor MS list among the serving BS's 204 served MSs, and then transmits a P2P MS list response message including the generated candidate MS list and the current resource status information of the BS 204 to the ASN-GW 206. Herein, although it is not depicted in the drawings, the neighboring BSs of the first MS 200 also generate the candidate MS list according to the request of the ASN-GW 208 by selecting MSs of the candidate P2P donor MS list among their served MSs, and then transmit a P2P MS list response message including the generated candidate MS list and the current resource status information to the ASN-GW 206. According to the design, when the P2P MS list request control message does not include the candidate P2P donor MS list, the serving BS 204 and the neighboring BS may generate the candidate MS list by selecting MSs satisfying a preset criterion, or generate the candidate MS list including all of their served MSs.

In step 230, the ASN-GW 206 forwards the P2P MS list response messages received from the serving BS 204 and the neighboring BS of the first MS 200, to the P2P server 208. Herein, based on the information collected from the serving BS and the neighboring BSs, the ASN-GW 206 can update the MS information and the BS resource statuses stored therein. The ASN-GW 206 may update the candidate MS list to be forwarded to the P2P server 208 by considering the preset provider policy, and the candidate MS lists and the BS resource status received from the serving BS and the neighboring BSs.

Herein, steps 214 through 230 for collecting the P2P MS list by requesting the P2P MS list to the serving BS and the neighboring BSs of the first MS 200 can be repeated on the periodic basis according to network configuration regardless of the MS request. While the P2P server 208 requests the P2P MS list to the ASN-GW 206 and then the ASN-GW 206 collects the P2P MS list and the resource status information in steps 224 through 230, the ASN-GW 206 may generate the P2P MS list based on the pre-collected information by performing steps 224 through 230 in advance.

In step 232, the P2P server 208 confirms the candidate MS list from the P2P MS list response message and selects the P2P donor MS in the confirmed candidate MS list. In so doing, the P2P server 208 selects the P2P donor MS for providing the intended contents to the first MS 200 based on the information of the candidate MS list in the P2P MS list response message, the resource status of the BS of each candidate MS, the pre-stored P2P service registered MS, content retention status of the P2P service registered MS, subscription information capabilities, subscriber policy, and service type) of the P2P service registered MS, and the relative location between the P2P request MS and the candidate MS. For example, the P2P server 208 can select the MS belonging to the P2P donor MS list preferred by the first MS 200 or the MS relatively close to the first MS 200 among the candidate MSs of the P2P MS list response message. In particular, the P2P server 208 can priority select the MS belonging to the serving BS of the first MS 200 among the candidate MSs of the P2P MS list response message. Herein, the P2P donor MS selection manner is exemplary, and the P2P server 208 can select the P2P donor MS using those information in various fashions within the scope and spirit of the present disclosure. The P2P server 208 may transmit the candidate MS list to the first MS 200 and request the first MS 200 to select the P2P donor MS.

To ease the understanding, it is now assumed that the second MS 202 can be selected as the P2P donor MS.

When the second MS 202 is selected as the P2P donor MS, the P2P server 208 transmits a P2P traffic path request control message to the corresponding ASN-GW 206 or BS 204 according to the relative location between the first MS 200 and the second MS 202 so as to optimize the traffic path between the first MS 200 requesting the P2P service and the second MS 202 which is the P2P donor MS. Herein, the P2P traffic path request control message can include current location information (e.g., serving BS ID and IP address) of the first MS 200, current location information (e.g., serving BS ID and IP address) of the second MS 202, and traffic classification information (e.g., source/destination IP addresses, source/destination port addresses, and protocol) for the traffic path optimization.

When the first MS 200 and the second MS 202 travel in the cell coverage of different BSs belonging to the same ASN-GW, the P2P server 208 sets the traffic path such that the traffic between the first MS 200 and the second MS 202 detours to the same ASN-GW, and transmits the P2P traffic path request message to the same ASN-GW 206 in step 234 as indicated by A. In so doing, the ASN-GW 206 stores the P2P traffic path for the first MS 200 and the second MS 202 in step 236 and forwards the P2P traffic path response message to the P2P server 208 in step 238.

When the first MS 200 and the second MS 202 belong to different ASN-GWs, the P2P server 208 sets the traffic path such that the traffic between the first MS 200 and the second MS 202 is transmitted directly between the two ASN-GWs, and transmits the P2P traffic path request message to the two ASN-GWs respectively as indicated by A.

By contrast, when the first MS 200 and the second MS 202 travel in the cell coverage of the same BS, the P2P server 208 sets the traffic path such that the traffic between the first MS 200 and the second MS 202 detours to the same BS, and transmits the P2P traffic path request message to the corresponding BS 204 in step 240 as indicated by B. In so doing, the BS 204 stores the P2P traffic path for the first MS 200 and the second MS 202 in step 242 and transmits the P2P traffic path response message to the P2P server 208 in step 244.

When the traffic path establishment is completed, the P2P server 208 transmits a P2P service response control message including the IP address and the traffic classification information of the second MS 202 selected as the P2P donor MS, to the first MS 200 in step 246. The P2P service response control message is transmitted to the MS 200 via the ASN-GW 206 and the BS 204.

Upon receiving the P2P service response control message, the first MS 200 transmits a P2P data request message requesting the P2P data service to the second MS 202 which is the P2P donor MS using the IP address and the traffic classification information of the P2P donor MS of the P2P service response control message in step 248. The P2P data request message includes information of contents desired by the first MS 200. The second MS 202 determines whether to accept the content provision through the P2P service in step 250, and transmits a P2P data response message indicating the acceptance or the rejection to the first MS 200 in step 252. The acceptance or the rejection can be determined by user control, or may be determined automatically based on conditions (e.g., a function in use and the remaining battery capacity) of the second MS 202.

When accepting the content provision through the P2P service, the second MS 202 transmits the corresponding contents to the first MS 200 in the P2P traffic path established by the P2P server 208 in step 254 or 256.

Upon successfully receiving the contents from the second MS 202 through the P2P service in step 260, the first MS 200 transmits a P2P service complete message indicating the normal completion of the P2P service to the P2P server 208 in step 262. When the second MS 202 rejects the content provision of the P2P service, the first MS 200 can transmit the P2P service complete message indicating completion error of the P2P service to the P2P server 208 in step 262.

In step 264, the P2P server 208 records the content retention of the first MS 200 in a content database which stores contents of the P2P service registered MSs.

Next, the P2P server 208 transmits a P2P traffic path delete control message requesting to delete the previous traffic path, to the ASN-GW 206 or the BS 204 corresponding to the traffic path of the first MS 200.

That is, along the traffic path for the first MS 200, the P2P server 208 may transmit the P2P traffic path delete control message to the ASN-GW 206 in step 266 as indicated by A', and transmit the P2P traffic path delete control message to the BS 204 in step 272 as indicated by B'.

The ASN-GW 204 or the BS 206 receiving the P2P traffic path delete control message deletes the traffic path for the first MS 200 in step 268 or 274, and then transmits a P2P traffic path delete ACK control message to the P2P server 208 in step 270 or 276.

In step 278, the P2P server 208 transmits a P2P service complete control message to the first MS 200 in step 278 and thus informs of the successful P2P service completion. When the P2P service complete message sent from the first MS 200 indicates the completion error, the P2P server 208 may omit step 264, delete the traffic path as indicated by A' or B', reselect the P2P donor MS back in step 222 or 232, and then reestablish the P2P traffic path so as to lead the first MS 200 to attempt the P2P service through a new P2P donor MS.

By contrast, when the second MS 200 transmits the corresponding contents to the first MS 200 in the P2P traffic path established by the P2P server 208 in step 254 or 256 and the first MS 200 migrates to other cell coverage, the serving BS 204 detects the handover of the first MS 200 in step 280. Herein, to facilitate the understanding, it is assumed that the first MS 200 hands over. The present disclosure is equally applicable to the handover of the second MS 202.

In step 282, the serving BS 204 transmits traffic path information of the first MS 200 to a handover target BS 205 using a HandOver (HO) control message. Herein, the HO control message can use, for example, a HO request message or a HO confirm message. The traffic path information of the first MS 200 can include the location information (e.g., ID and IP address of the serving BS, and ID and IP address of the target BS) of the first MS 200, and the location information (e.g., III) and IP address of the serving BS) of the second MS 202.

The target BS 205 analyzes the traffic path information delivered by the HO control message and thus determines whether the second MS 202 travels in the target BS's 205 cell coverage. When the second MS 202 is in the cell coverage of the target BS 205, the target BS 205 establishes traffic path such that the traffic between the first MS 200 and the second MS 202 detours to the target BS 205. By contrast, when the second MS 202 is outside the cell coverage of the target BS 205, the target BS 205 transmits a P2P traffic path registration request message including the traffic path information of the first MS 200, to the ASN-GW 206 in step 284. The ASN-GW 206 stores the P2P traffic path of the first MS 200 and transmits a P2P traffic path response message to the target BS 205 in step 286. Herein, when the serving BS 204 of the first MS 200 and the serving BS of the second MS 202 belong to different ASN-GWs, the ASN-GW 206 may request the different ASN-GWs to reestablish the P2P traffic path between the first MS 200 and the second MS 202.

Next, the first MS 200 hands over to the target BS 205 and receives the corresponding contents from the second MS 202 in the P2P traffic path established by the target BS 205 in step 254 or 256.

Figure 3:
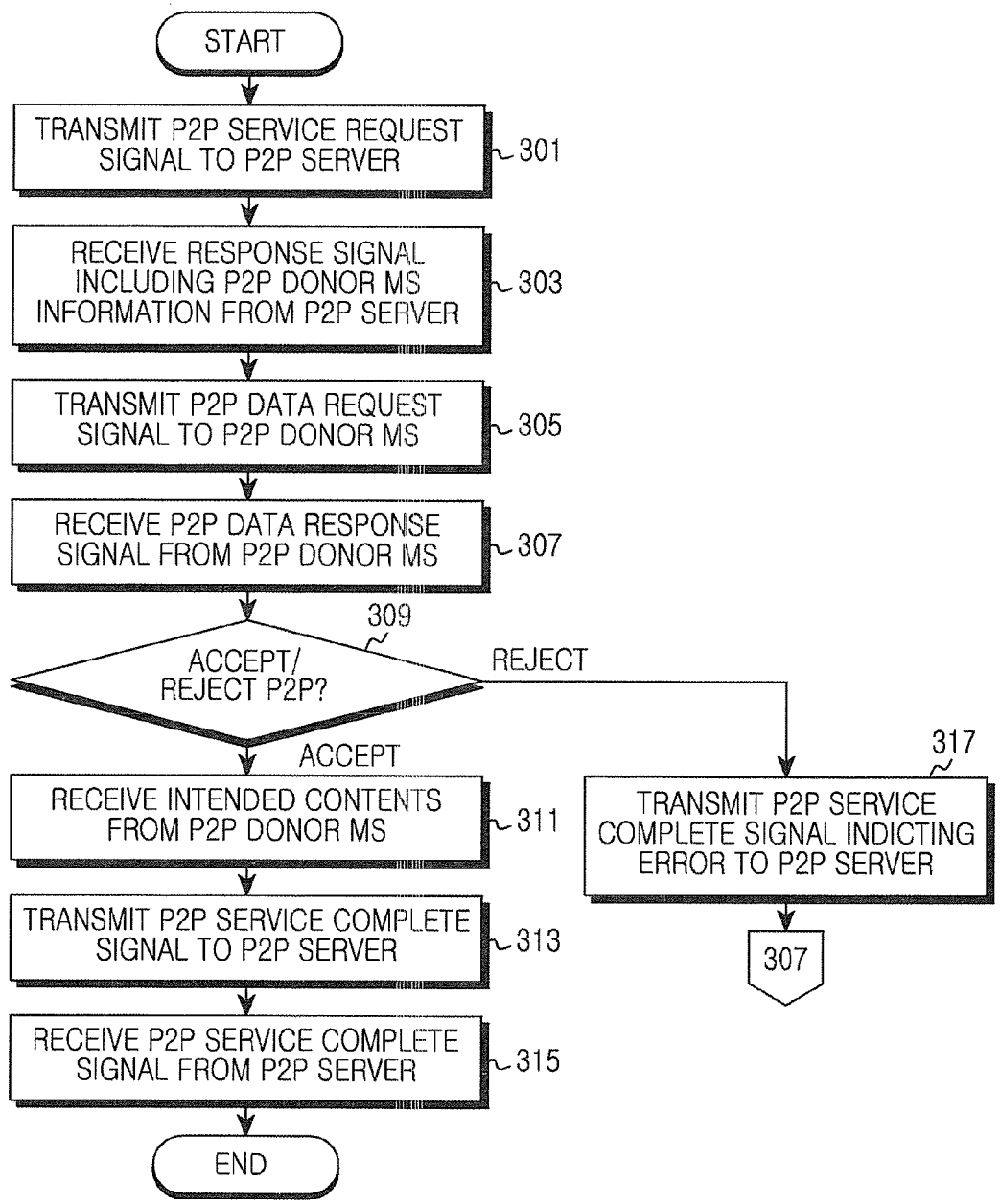
FIG. 3 illustrates operations of an MS for requesting the P2P service in the wireless communication system according to an exemplary embodiment of the present disclosure.

FIG. 3 illustrates operations of the MS for requesting the P2P service in the wireless communication system according to an exemplary embodiment of the present disclosure.

In step 301, the MS requesting the P2P service transmits to the P2P server, the P2P service request message requesting to inform of the MS capable of providing the requesting MS's intended contents through the P2P service. The P2P service request message includes the information of the contents desired by the MS, the P2P donor MS list preferred by the first MS, and the ID of the first MS, and is transmitted as the control message of the higher layer. Notably, the P2P service request message may not include the P2P donor MS list preferred by the first MS according to the design.

In step 303, the MS receives the P2P service response control message including the P2P donor MS information from the P2P server. Herein, the P2P service response control message includes the IP address and the traffic classification information of the P2P donor MS.

In step 305, the MS obtains the IP information and the traffic classification information of the P2P donor MS from the P2P service response control message, and transmits the P2P data request message requesting the P2P data service to the P2P donor MS. The P2P data request message includes the information of the contents desired by the MS.

Next, the MS receives the P2P data response message from the P2P donor MS in step 307, and determines whether the P2P donor MS accepts or rejects the content provision through the P2P service by analyzing the P2P data response message in step 309. When the P2P donor MS rejects the content provision through the P2P service, the MS transmits the message indicating the P2P service end due to the error, to the P2P server in step 317, and then returns to step 307.

By contrast, when the P2P donor MS accepts the content provision through the P2P service, the MS receives its intended contents from the P2P donor MS in step 311. When completing the content reception, the MS transmits the message indicating the normal P2P service completion to the P2P server in step 313.

Next, the MS receives the P2P service complete message from the P2P server in step 315 and finishes this process.

Figure 4:
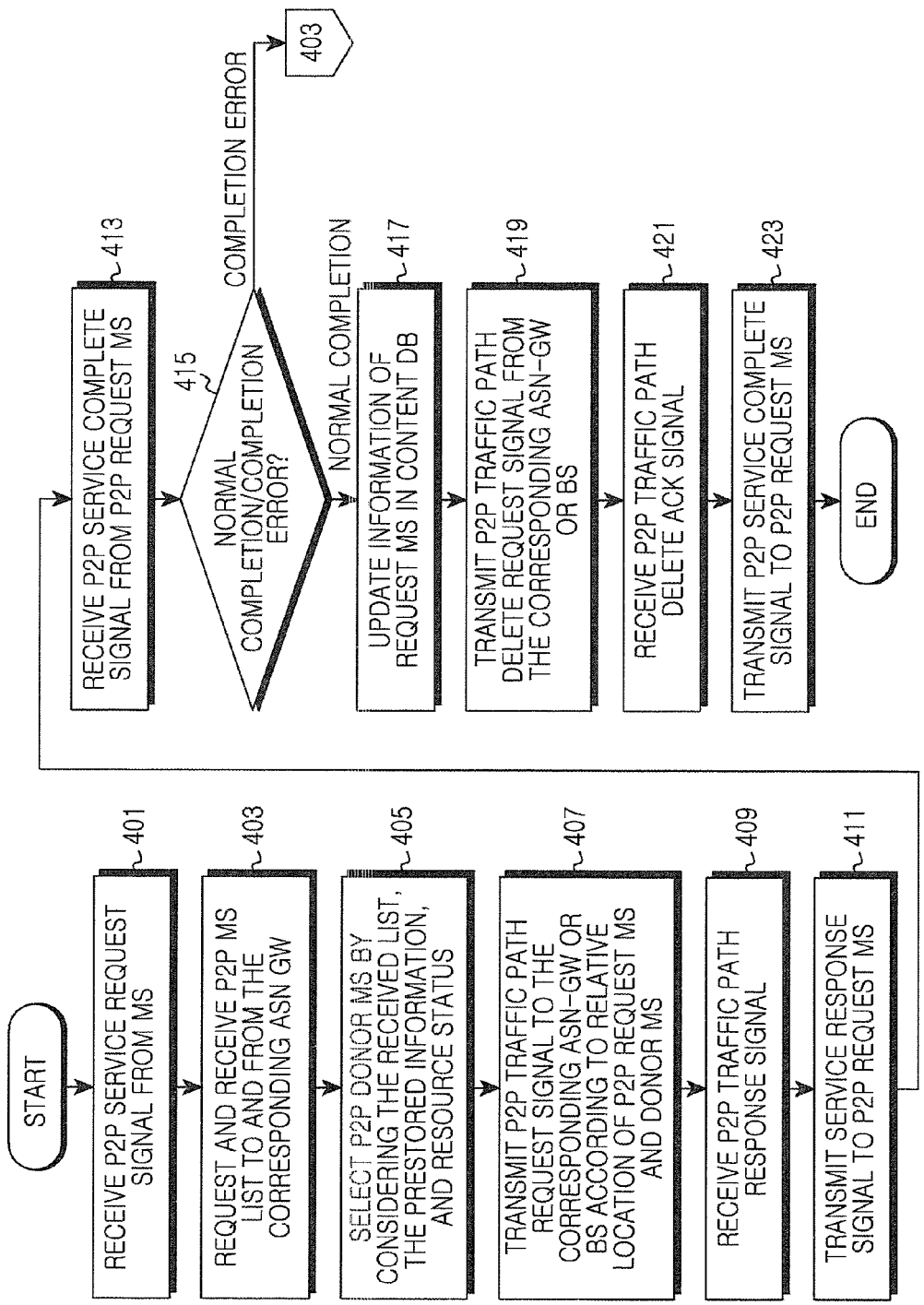
FIG. 4 illustrates operations of a P2P server in the wireless communication system according to an exemplary embodiment of the present disclosure.

FIG. 4 illustrates operations of the P2P server in the wireless communication according to an exemplary embodiment of the present disclosure.

In step 401, the P2P server receives the P2P service request message from the MS. The P2P service request message can include the ID of the MS requesting the P2P service, the information of the contents desired by the P2P request MS, and the preferred MS list.

In step 403, the P2P server transmits the message requesting the information of the MSs currently serviced; that is, the P2P MS list request control message to the ASN-GW which forwards the P2P service request message, and receives the P2P MS list response control message from the ASN-GW. Herein, the P2P MS list request control message includes the ID of the P2P request MS and the candidate P2P donor MS list. The P2P MS list response control message includes the list of the MSs currently serviced by the ASN-GW among the MSs of the candidate P2P donor MS list; that is, the candidate MS list, and the resource status information of the BS corresponding to the candidate MSs. The P2P server can generate the candidate P2P donor MS list by considering the preferred P2P donor MS list received from the P2P request MS, the information of the contents desired by the MS, the list of the MSs having contents among the MSs registered to the P2P server, and other provider policy.

In step 405, the P2P server confirms the candidate MS list from the P2P MS list response message and selects the P2P donor MS in the confirmed candidate MS list. In so doing, the P2P server selects the P2P donor MS for providing the intended contents to the P2P request MS based on the information of the candidate MS list in the P2P MS list response message, the resource status of the BS of each candidate MS, the pre-stored P2P service registered MS, the content status of the P2P service registered MS, the subscription information (e.g., capabilities, subscriber policy, and service type) of the P2P service registered MS, and the relative location between the P2P request MS and the candidate MS. For example, the P2P server can select the P2P donor MS preferred by the P2P request MS or the MS relatively close to the first MS 200 among the candidate MSs of the P2P MS list response message. In particular, the P2P server can priority select the MS belonging to the serving BS of the P2P request MS amongst the candidate MSs of the P2P MS list response message. Herein, the P2P donor MS selection manner is exemplary, and the P2P server can select the P2P donor MS using those information in various fashions within the scope and spirit of the present disclosure.

In step 407, the P2P server transmits the P2P traffic path request control message to the corresponding ASN-GW or BS according to the relative location between the P2P request MS and the P2P donor MS. Herein, the P2P traffic path request control message can include the traffic classification information (e.g., source/destination IP addresses, source/destination port addresses, and protocol) for the traffic path optimization. For example, when the P2P request MS and the P2P donor MS travel in the cell coverage of different BSs belonging to a particular ASN-GW, the P2P server sets the traffic path such that the corresponding P2P traffic detours to the particular ASN-GW, and transmits the P2P traffic path request message to the particular ASN-GW. When the P2P request MS and the P2P donor MS belong to different ASN-GWs, the P2P server sets the traffic path such that the corresponding P2P traffic is transmitted directly between the two ASN-GWs, and transmits the P2P traffic path request message to the two ASN-GWs respectively.

Next, the P2P server completes the P2P traffic path establishment by receiving the P2P traffic path response message from the corresponding ASN-GW or BS in step 409 and transmitting the P2P service response control message including the IP address and the traffic classification information of the P2P donor MS to the P2P request MS in step 411.

The P2P server receives the P2P service complete message from the P2P request MS in step 413, and determines whether the P2P service complete message indicates the normal completion or the completion error in step 415.

When the P2P service complete message indicates the normal completion, the P2P server updates the content retention information of the P2P request MS in the content database storing the contents of the P2P service registered MSs in step 417, and transmits the P2P traffic path delete control message requesting to delete the previous traffic path, to the ASN-GW or the BS corresponding to the traffic path of the P2P request MS in step 419. Next, the P2P server receives the P2P traffic path delete ACK message from the corresponding ASN-GW or BS in step 421, and then transmits the P2P service complete control message to the P2P request MS to inform of the successful P2P service completion in step 423.

Next, the P2P server finishes this process.

By contrast, when the P2P service complete message indicates the completion error in step 415, the P2P server transmits the P2P traffic path delete message requesting to delete the P2P traffic path to the corresponding ASN-GW or BS. When the P2P traffic path deletion is completed, the P2P server goes back to step 403 to lead the P2P request MS to attempt the P2P service via a new P2P donor MS. In so doing, according to the design, the P2P server may delete the P2P traffic path and then return to step 405.

Figure 5:
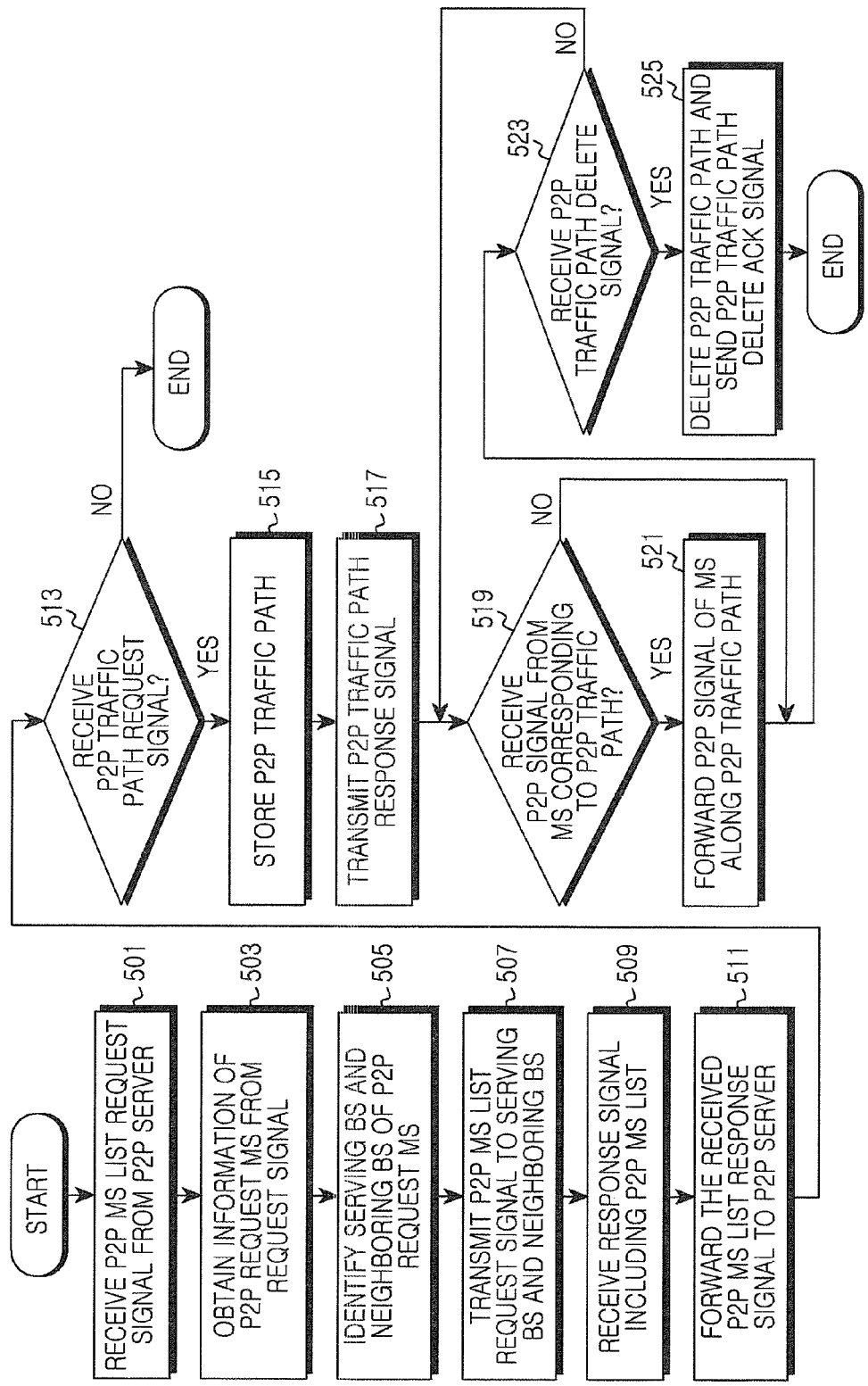
FIG. 5 illustrates operations of a gateway for the P2P service in the wireless communication according to an exemplary embodiment of the present disclosure.

FIG. 5 illustrates operations of the gateway for the P2P service in the wireless communication system according to an exemplary embodiment of the present disclosure.

In step 501, the ASN-GW receives the P2P MS list request control message from the P2P server. Herein, the P2P MS list request control message includes the ID of the MS requesting the P2P service.

The ASN-GW obtains the ID of the P2P request MS from the P2P MS list request control message in step 503, and searches for the serving BS accessed by the P2P request MS and the neighboring BS in step 505. Next, the ASN-GW forwards the P2P MS list request control message to the searched serving BS and neighboring BS in step 507, and receives the P2P MS list response message including the candidate MS list from the serving BS and the neighboring BS in step 509. In step 511, the ASN-GW forwards the received P2P MS list response message to the P2P server. Herein, the P2P MS list response message can include the resource status information of the serving BS and the neighboring BS.

In step 513, the ASN-GW checks whether the P2P traffic path request message is received from the P2P server. When not receiving the P2P traffic path request message, the ASN-GW finishes this process.

By contrast, upon receiving the P2P traffic path request message, the ASN-GW stores the traffic path of the received P2P traffic path request message in step 515 and transmits the P2P traffic path response message to the P2P server in step 517. Herein, the P2P traffic path request message can include the traffic classification information (e.g., source/destination IP addresses, source/destination port addresses, and protocol).

In step 519, the ASN-GW determines whether the P2P traffic signal is received from the MS corresponding to the P2P traffic path; that is, from the P2P request MS or the P2P donor MS. When not receiving the P2P traffic signal, the ASN-GW goes to step 523.

Receiving the P2P traffic signal, the ASN-GW forwards the P2P traffic signal to the corresponding BS or other ASN-GW along the P2P traffic path in step 521.

In step 523, the ASN-GW determines whether the P2P traffic path delete message is received from the P2P server. When not receiving the P2P traffic path delete message, the ASN-GW goes back to step 519.

Upon receiving the P2P traffic path delete message, the ASN-GW deletes the previously stored P2P traffic path and transmits the P2P traffic path delete message indicating the P2P traffic path deleted to the P2P server in step 525.

Next, the ASN-GW finishes this process.

Figure 6A:
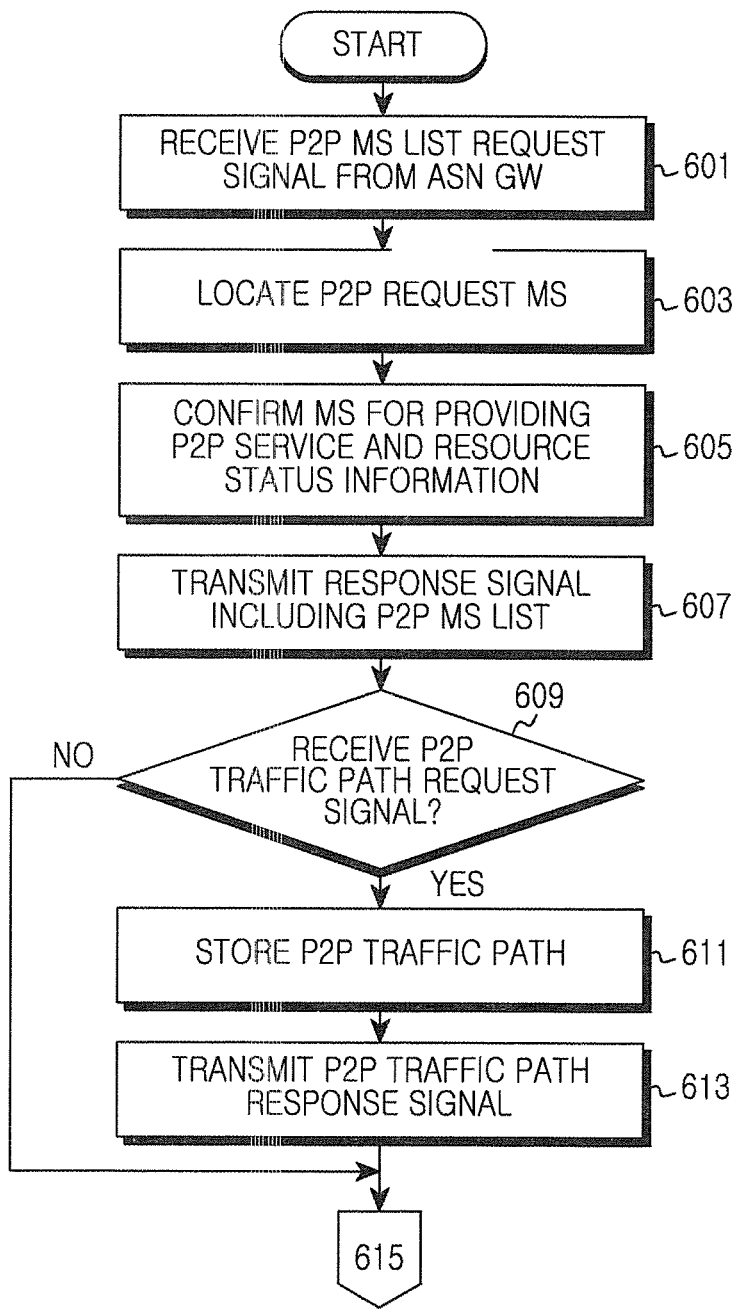
FIGS. 6A and 6B illustrate operations of a BS for the P2P service in the wireless communication system according to an exemplary embodiment of the present disclosure.
Figure 6B:
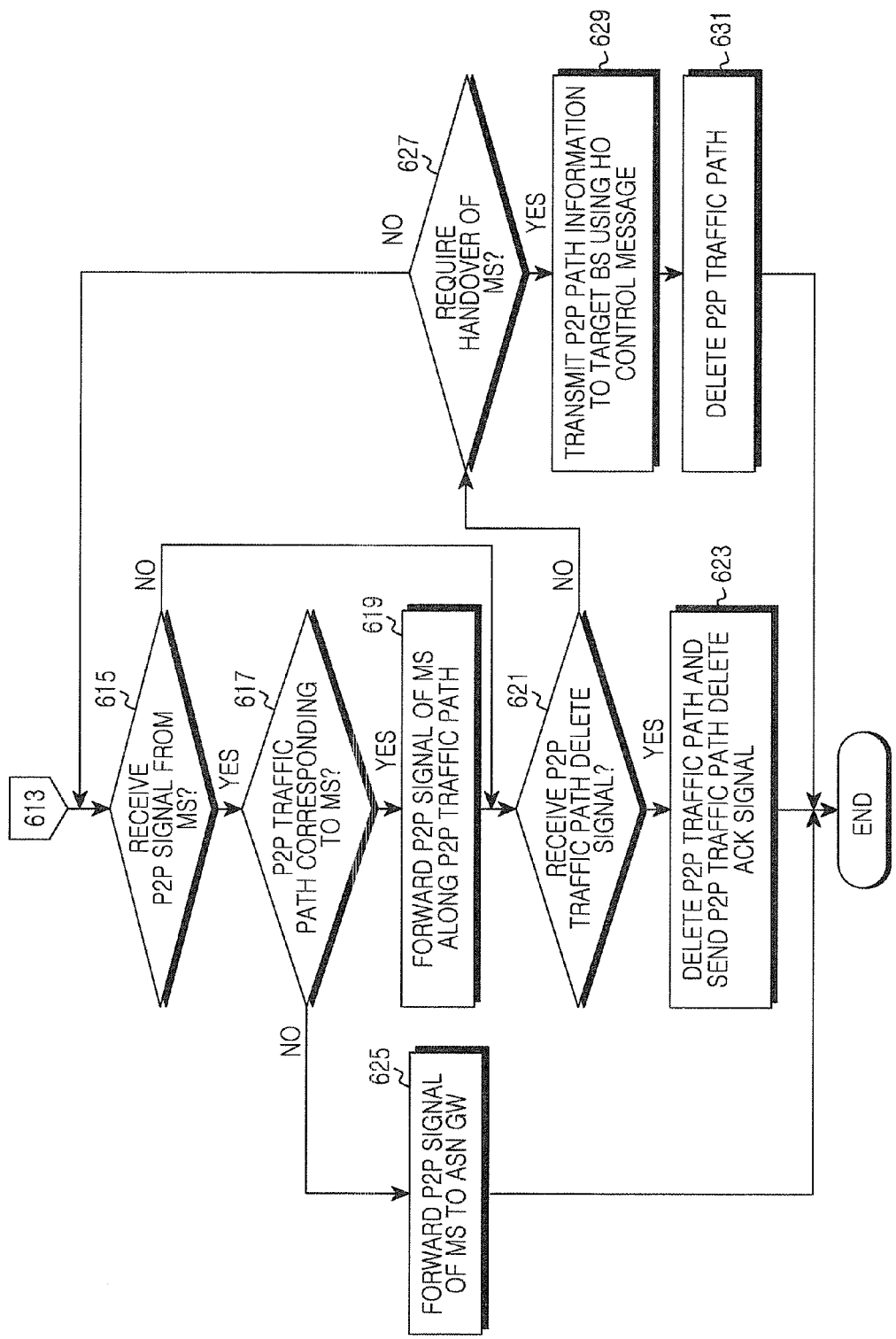

FIGS. 6A and 6B illustrate operations of the BS for the P2P service in the wireless communication system according to an exemplary embodiment of the present disclosure.

In step 601, the BS receives from the ASN-GW the P2P MS list request control message requesting the information of the MSs capable of serving the P2P request MS.

The BS locates the P2P request MS in step 603, confirms the candidate MS list for providing the P2P service to the P2P request MS and the resource status information of the BS in step 605, and transmits the P2P MS list response control message including the candidate MS and the resource status information of the BS in step 607. Herein, the BS obtains the candidate P2P donor MS list from the P2P MS list request control message, compares the obtained candidate P2P donor MS list and the BS's served MS list, and generates the candidate MS list by selecting the MSs of the candidate P2P donor MS list among the BS's served MSs. According to the design, the BS may generate the candidate MS list by selecting the MSs in the sector close to the neighboring BS when the P2P request MS belongs to the neighboring BS, or by selecting all of the MSs in the BS when the P2P request MS belongs to the BS itself.

In step 609, the BS determines whether the P2P traffic path request message is received from the P2P server. When not receiving the P2P traffic path request message, the BS proceeds to step 615.

By contrast, when receiving the P2P traffic path request message, the BS stores the traffic path of the received P2P traffic path request message in step 611 and transmits the P2P traffic path response message to the P2P server in step 613. Herein, the P2P traffic path request message can include the traffic classification information (e.g., source/destination IP addresses, source/destination port addresses, and protocol).

In step 615, the BS determines whether the P2P traffic signal is received from the P2P request MS or the P2P donor MS. When not receiving the P2P traffic signal, the BS goes to step 621. When receiving the P2P traffic signal, the BS checks whether the BS stores the P2P traffic path corresponding to the MS transmitting the P2P traffic signal in step 617. When not storing the P2P traffic path, the BS forwards the P2P traffic signal to the ASN-GW which is the higher node in step 625.

When storing the P2P traffic path, the BS forwards the P2P traffic signal to the corresponding MS or the higher ASN-GW along the P2P traffic path in step 619.

In step 621, the BS determines whether the P2P traffic path delete message is received from the P2P server. When not receiving the P2P traffic path delete message, the BS proceeds to step 627.

In step 627, the BS determines whether the MS which is using the P2P service hands over. When the MS in the P2P service does not hand over, the BS returns to step 615.

By contrast, when the MS in the P2P service hands over, the BS transmits the P2P traffic path information of the MS to the HO target BS of the MS using the HO control message in step 629. Herein, the HO control message can be the HO request message or the HO confirm message. The P2P traffic path information can include the location information (e.g., ID and IP address of the serving BS, and ID and IP address of the target BS) of the MS, the ID of the P2P peer MS, and the location information (e.g., ID and IP address of the serving BS) of the P2P peer MS. Herein, although it is not depicted in FIG. 6B, when the BS does not store the P2P traffic path information of the MS, it may inform the ASN-GW of the MS handover to the target BS to lead the ASN-GW to reestablish the P2P traffic path of the MS.

When the handover of the MS is over, the BS deletes the P2P traffic path information of the MS in step 631 and finishes this process.

By contrast, when receiving the P2P traffic path delete message, the BS deletes the P2P traffic path previously stored and transmits the P2P traffic path delete message indicating the P2P traffic path deleted to the P2P server in step 623.

Next, the BS finishes this process.

Figure 7:
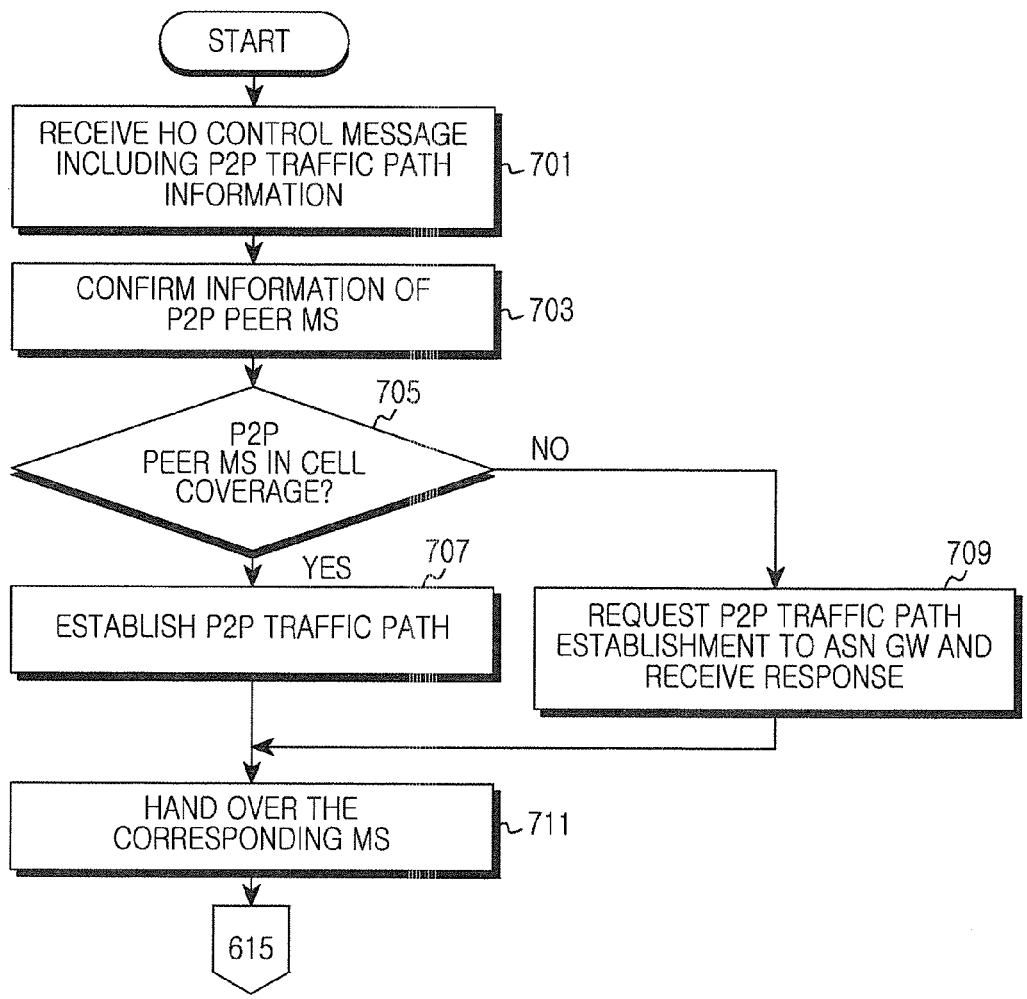
FIG. 7 illustrates operations of a target BS when the MS using the P2P service hands over in the wireless communication system according to an exemplary embodiment of the present disclosure.

FIG. 7 illustrates operations of the target BS when the MS using the P2P service hands over in the wireless communication system according to an exemplary embodiment of the present disclosure.

The target BS receives the HO control message including the P2P traffic path information of the particular MS in step 701 and confirms the information of the P2P peer MS from the P2P traffic path information in step 703. In step 705, the target BS determines whether the P2P peer MS travels in the target BS's cell coverage. Herein, the target BS can check whether the P2P peer MS is in the target BS's cell coverage using the location information of the P2P peer MS of the P2P traffic path information.

When the P2P peer MS is in the cell coverage, the target BS establishes the traffic path such that the P2P traffic between the particular MS and the P2P peer MS detours to the target BS in step 707.

By contrast, when the P2P MS is not in the cell coverage, the target BS transmits the P2P traffic path registration request message including the traffic path information of the particular MS to the ASN-GW and receives the traffic path registration response message from the ASN-GW in step 709.

In step 711, the target BS hands the particular MS to the serving BS in step 711 and goes to step 615 of FIG. 6.

Figure 8:
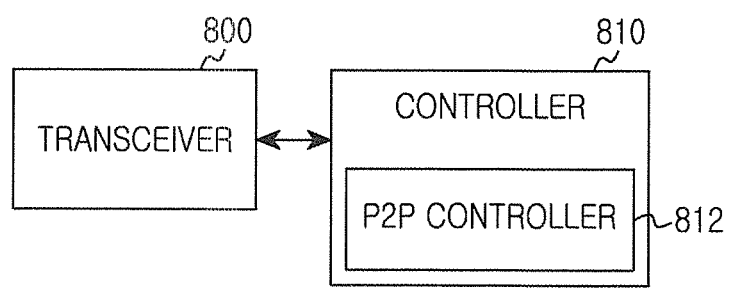
FIG. 8 illustrates the MS in the wireless communication system according to an exemplary embodiment of the present disclosure.

FIG. 8 is a block diagram of the MS in the wireless communication system according to an exemplary embodiment of the present disclosure.

Referring to FIG. 8, the MS includes a transceiver 800 and a controller 810. The controller 810 includes a P2P controller 812.

The transceiver 800 controls and processes to transmit and receive signals to and from the BS under control of the controller 810.

The controller 810 controls and processes the operations of the MS. When determining that the P2P service is necessary, the controller 810 controls and processes the P2P controller 812 to receive the intended contents from the other MS registered to the P2P service.

That is, the P2P controller 812 controls and processes to transmit to the P2P server the P2P service request message requesting to inform of the MS capable of providing the intended contents using the F'2P service, and to receive from the P2P server the P2P service response control message including the P2P donor MS information. In so doing, the P2P service request message includes the information of the contents desired by the MS, the P2P donor MS list preferred by the first MS, and the ID of the first MS. The P2P service response control message includes the IP address and the traffic classification information of the P2P donor MS.

The P2P controller 812 controls and processes to obtain the IP information and the traffic classification information of the P2P donor MS from the P2P service response control message, to transmit the P2P data request message requesting the P2P data service to the P2P donor MS, and to receive the P2P data response message from the P2P donor MS. Herein, the P2P data request message includes the information of the contents desired by the MS.

The P2P controller 812 analyzes the P2P data response message and thus checks whether the P2P donor MS accepts or rejects the content provision using the P2P service. When the P2P donor MS rejects the content provision using the P2P service, the P2P controller 812 transmits the message indicating the P2P service completion error to the P2P server. When the P2P donor MS accepts the content provision using the P2P service, the P2P controller 812 controls and processes to receive the intended contents from the P2P donor MS and to transmit the message indicating the normal completion of the P2P service to the P2P server.

Figure 9:
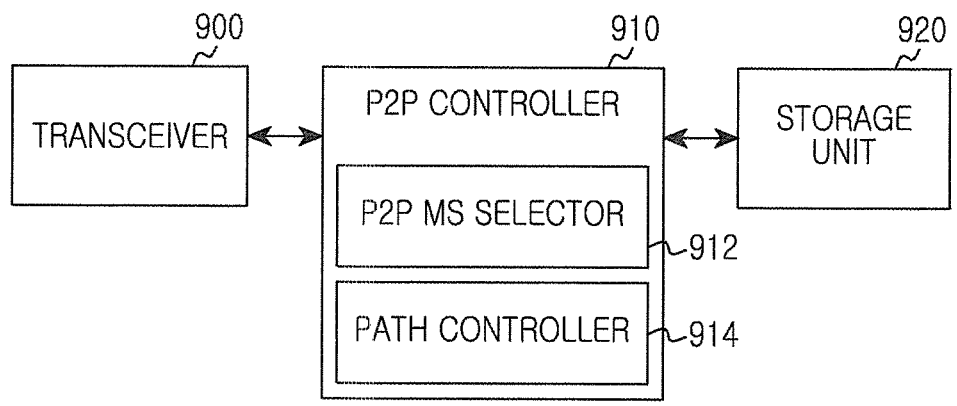
FIG. 9 illustrates the P2P server in the wireless communication system according to an exemplary embodiment of the present disclosure.

FIG. 9 is a block diagram of the P2P server in the wireless communication system according to an exemplary embodiment of the present disclosure.

Referring to FIG. 9, the P2P server includes a transceiver 900, a P2P controller 910, and a storage unit 920. The P2P controller 910 includes a P2P MS selector 912 and a path controller 914.

The transceiver 900 controls and processes to transmit and receive signals to and from the plurality of the ASN-GWs connected over the core network under control of the P2P controller 910.

The controller 910 controls and processes the functions for providing the P2P service. In particular, when receiving the P2P service request message from the particular MS, the controller 910 controls and processes the P2P MS selector 912 to select the MS for providing the intended contents of the particular MS among the MSs registered to the P2P service.

That is, to select the P2P donor MS for the particular MS requesting the P2P service, the P2P MS selector 912 controls and processes to transmit the P2P MS list request control message including the candidate P2P donor MS list to the ASN-GW which forwards the P2P service request message, and to receive the P2P MS list response control message from the ASN-GW. Herein, the P2P MS list request control message includes the ID of the P2P request MS and the candidate P2P donor MS list, and the P2P MS list response control message includes the candidate MS list of the MSs currently serviced by the ASN-GW among the MSs of the candidate P2P donor MS list, and the resource status information of the BS corresponding to the MSs of the candidate MS list.

The P2P MS selector 912 confirms the candidate MS list from the P2P MS list response message and selects the P2P donor MS in the confirmed candidate MS list. In so doing, the P2P MS selector 912 selects the P2P donor MS for providing the intended contents of the first MS 200 based on the information of the candidate MS list in the P2P MS list response message, the resource status of the BS of each candidate MS, the pre-stored P2P service registered MS, the content retention status of the P2P service registered MS, the subscription information (e.g., capabilities, subscriber policy, and service type) of the P2P service registered MS, and the relative location between the P2P request MS and the candidate MS. For example, the P2P MS selector 912 can select the P2P donor MS preferred by the P2P request MS or the MS relatively close to the P2P request MS among the candidate MSs of the P2P MS list response message. In particular, the P2P MS selector 912 can priority select the MS belonging to the serving BS of the P2P request MS from the candidate MSs of the P2P MS list response message. Herein, the P2P donor MS selection manner is exemplary, and the P2P MS selector 912 can select the P2P donor MS using those information in various fashions within the scope and spirit of the present disclosure.

When the P2P MS selector 912 selects the P2P donor MS, to establish the traffic path based on the relative location between the P2P request MS and the P2P donor MS, the path controller 914 controls and processes to complete the P2P traffic path establishment by transmitting the P2P traffic path request control message to the corresponding ASN-GW or BS and receiving the P2P traffic path response message from the corresponding ASN-GW or BS. Herein, the P2P traffic path request control message can include the traffic classification information (e.g., source/destination IP addresses, source/destination port addresses, and protocol) for the traffic path optimization.

As such, when the P2P MS selector 912 selects the P2P donor MS and the path controller 914 establishes the traffic path between the P2P request MS and the P2P donor MS, the controller 900 controls and processes to transmit the P2P service response control message including the IP address and the traffic classification information of the P2P donor MS to the P2P request MS. Next, upon receiving the P2P service complete message from the P2P request MS, the controller 900 checks whether the P2P service complete message indicates the normal completion or the completion error.

When the P2P service complete message indicates the normal completion, the controller 900 controls and processes to update and store the content retention information of the P2P request MS to the storage unit 920 and to delete the traffic path established between the P2P request MS and the P2P donor MS through the path controller 914. That is, the path controller 914 controls and processes to transmit the P2P traffic path delete control message requesting to delete the previous traffic path to the ASN-GW or the BS corresponding to the traffic path of the P2P request MS and the P2P donor MS, and to receive the P2P traffic path delete ACK message from the corresponding ASN-GW or BS. When the P2P service complete message indicates the completion error, the controller 900 controls and processes the path controller 914 to delete the traffic path between the P2P request MS and the P2P donor MS and the P2P MS selector 912 to select a new P2P donor MS.

The storage unit 920 stores various programs and data for the operations of the P2P server. Particularly, the storage unit 920 stores the list of the MSs registered to the P2P service and the information of the contents of the MSs registered to the P2P service. The storage unit 920 can store the information (e.g., P2P request MS, P2P donor MS, traffic path, and contents transmitted and received) of the MSs in the P2P service, and the resource status information of the BSs under the control of the controller 910.

Figure 10:
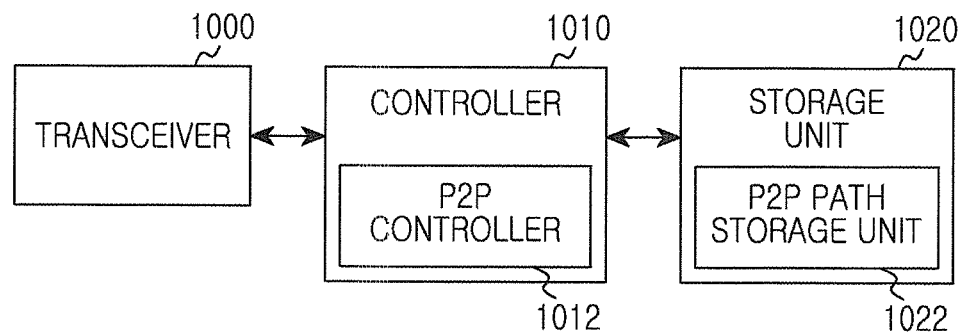
FIG. 10 illustrates the gateway in the wireless communication system according to an exemplary embodiment of the present disclosure.

FIG. 10 is a block diagram of the gateway in the wireless communication system according to an exemplary embodiment of the present disclosure.

Referring to FIG. 10, the ASN-GW includes a transceiver 1000, a controller 1010, and a storage unit 1020. The controller 1010 includes a P2P controller 1012.

The transceiver 1000 controls and processes to transmit and receive the messages to and from the P2P server and other ASN-GW over the core network and to transmit and receive the messages to and from a plurality of BSs which are the lower nodes under the control of the controller 1010.

The controller 1010 controls the plurality of the BSs, and controls and processes to route the data flows between the BSs by interconnecting the BSs with the core network. In particular, when receiving the P2P MS list request message from the P2P server, the controller 1010 including the P2P controller 1012 controls and processes to collect from the BSs the information of the MSs capable of providing the P2P service to the P2P request MS by forwarding the P2P MS list request message to the corresponding BSs, and to provide the collected information to the P2P server. That is, The P2P controller 1012 controls and processes to obtain the ID of the P2P request MS from the P2P list request control message, to search for the serving BS accessed by the P2P request MS and the neighboring BS, to transmit the P2P MS list request message to the searched service BS and neighboring BS, and to receive the candidate MS list. When receiving the candidate MS list, the P2P controller 1012 controls and processes to transmit the received candidate MS list and the resource status information of the serving BS and the neighboring BSs to the P2P server.

When receiving the P2P traffic path request message from the P2P server, the P2P controller 1012 controls and processes to obtain the traffic path in the received P2P traffic path request message, to store the traffic path to a P2P path storage unit 1022 of the storage unit 1020, and to transmit the P2P traffic path response message to the P2P server. When receiving the P2P traffic signal from the MS corresponding to the stored P2P traffic path; that is, from the P2P request MS or the P2P donor MS, the P2P controller 1012 controls and processes to forward the received P2P traffic signal to the corresponding BS or other ASN-GW along the P2P traffic path. When receiving the P2P traffic path delete message from the P2P server, the P2P controller 1012 controls and processes to delete the corresponding P2P traffic path in the P2P path storage unit 1022 of the storage unit 1020 and to transmit the P2P traffic path delete message indicating the P2P traffic path deleted to the P2P server. The BS requests to reestablish the traffic path for the particular HO MS, and the P2P controller 1012 controls and processes to reestablish the traffic path according to the location information of the P2P peer MS for the particular HO MS. For example, the P2P controller 1012 can determine whether the BS accessed by the P2P peer MS is the BS corresponding to the ASN-GW or the BS of other ASN-GW, and thus establish the traffic path between the particular HO MS and the P2P peer MS within the ASN-GW or request the other ASN-GW to reestablish the path of the particular HO MS and the P2P peer MS.

The storage unit 1020 controls and processes the operations of the ASN-GW. Specifically, the storage unit 1020 including the P2P path storage unit 1022 stores the traffic paths of the P2P MSs in the current P2P service. Under the control of the controller 1010, the storage unit 1020 can store the information of the MS connected to the BS and the resource status information of the BSs.

Figure 11:
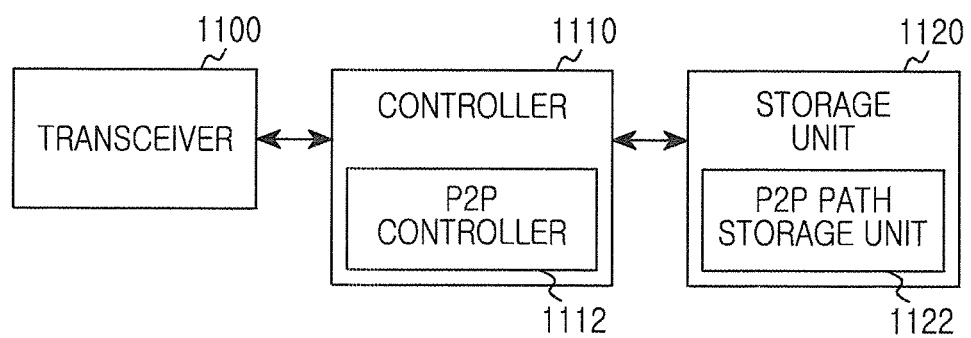
FIG. 11 illustrates the BS in the wireless communication system according to an exemplary embodiment of the present disclosure.

FIG. 11 is a block diagram of the BS in the wireless communication system according to an exemplary embodiment of the present disclosure.

Referring to FIG. 11, the BS includes a transceiver 1100, a controller 1110, and a storage unit 1120. The controller 1110 includes a P2P controller 1112, and the storage unit 1120 includes a P2P path storage unit 1122.

Under the control of the controller 1110, the transceiver 1100 controls and processes to transmit and receive signals to and from the ASN-GW and the MS.

The controller 1110 controls and processes to communicate with the MS over a radio channel, to forward the signal from the higher node ASN-GW to the MS, and to forward the signal of the MS to the ASN-GW. In particular, when the ASN-GW requests the information of the MSs capable of servicing the P2P request MS, the controller 1110 including the P2P controller 1112 identifies the MS for providing the P2P service to the P2P request MS according to the location of the P2P request MS, and checks and transmits the resource status information of the BS to the ASN-GW. When receiving the P2P traffic path request message, the P2P controller 1112 controls and processes to store the received P2P traffic path to the P2P path storage unit 1122 of the storage unit 1120 and transmit the P2P traffic path response message. When receiving the P2P traffic signal from the MS corresponding to the stored P2P traffic path; that is, from the P2P request MS or the P2P donor MS, the P2P controller 1112 controls and processes to forward the received P2P traffic signal to the corresponding MS or ASN-GW along the P2P traffic path. When receiving the P2P traffic path delete message, the P2P controller 1112 controls and processes to delete the corresponding P2P traffic path in the P2P path storage unit 1122 of the storage unit 1120 and to transmit the P2P traffic path delete message indicating the P2P traffic path deleted. When a particular MS using the P2P service hands over, the controller 1110 controls and processes to transmit the P2P traffic path information of the particular MS to the target BS using the HO control message. When receiving the P2P traffic path information for a particular MS from the neighboring BS using the HO control message, the controller 1110 controls and processes to set the P2P traffic path for the particular MS. In so doing, the controller 1110 can request the ASN-GW to reestablish the traffic path based on the location information of the P2P peer MS. The storage unit 1120 controls and processes the operations of the BS. In particular, the storage unit 1120 including the P2P path storage unit 1122 stores traffic paths of the P2P peer MSs in the current P2P service. Under the control of the controller 1110, the storage unit 1120 can store the information of the MS connected to the BS and the resource status information of the BS.

In the wireless communication system, the information of the MSs capable of providing the P2P service is collected based on the location of the MS requesting the P2P service, the P2P service donor MS is selected by considering the preferred MS of the P2P service request MS, the radio resource status of the BS, and the P2P service registered MS, and the traffic path of the P2P service is established and managed by taking account of the relative location of the P2P service request MS and the P2P service donor MS. Therefore, the network load can be reduced by minimizing the traffic volume and the network congestion and the communication quality degradation can be mitigated.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a server for providing a peer-to-peer (P2P) service in a wireless communication system, the method comprising:
  receiving a P2P service request signal comprising information of contents requested by a mobile station (MS) and information of preferred peer MSs of the MS;
  selecting a peer MS from a list of MSs having the contents based on a distance between the peer MS and the MS and based on an available resource status of at least two serving base stations (BSs) of the MSs on the list and based on the information of the preferred peer MSs of the MS;
  transmitting information of the selected peer MS to the MS;
  receiving, from the MS, a signal for another peer MS selection when the MS receives a response signal including a rejection of the P2P service from the selected peer MS;
  selecting another peer MS from the list of MSs having the contents; and
  transmitting information of the another peer MS to the MS.

2. The method of claim 1, wherein selecting the peer MS from the list of MSs having the contents comprises:
  comparing a network node of the MS with a network node of each of a plurality of MSs included in the list of MSs;
  selecting the peer MS belonging in the network node that are identical with the network node of the MS among the plurality of MSs based on the comparing,
  wherein the network node includes at least one of the serving BSs and an access service network gateway (ASN GW),
  wherein the distance between the MS and the peer MS is determined based on a network node of the MS and a network node of the peer MS.

3. The method of claim 1, wherein selecting the peer MS from the list of MSs having the contents comprises:
  requesting the list of MSs capable of providing the P2P service to the MS to a gateway corresponding to the MS; and
  receiving the list of MSs capable of providing the P2P service to the MS from the gateway.

4. The method of claim 1, further comprises:
  determining a traffic path based on a serving BS identifier of the MS and a serving BS identifier of the peer MS; and
  transmitting a traffic path establishment request message to a node corresponding to the determined traffic path,
  wherein the traffic path establishment request message comprises at least one of the serving BS identifier of the MS, an IP address of a serving BS of the MS, the serving BS identifier of the peer MS, an IP address of a serving BS of the peer MS, and traffic classification information of the traffic path, and
  wherein the traffic classification information comprises at least one of source a IP address, a destination IP addresses, a source port address, a destination port addresses, and a protocol.

5. The method of claim 4, wherein:
  the node corresponding to the determined traffic path comprises only the serving BS of the MS, if the serving BS identifier of the MS is identical with the serving BS identifier of the peer MS; and
  the node corresponding to the determined traffic path comprises at least one of a gateway of the MS and a gateway of the peer MS, if the serving BS identifier of the MS is not identical with the serving BS identifier of the peer MS.

6. The method of claim 1, further comprising:
  transmitting at least one of an MS ID and serving BS ID of the MS to an Authentication Authorization Accounting (AAA);
  receiving information of an ASN-GW corresponding to the MS from the AAA.

7. The method of claim 1, further comprising establishing a traffic path between the MS and the peer MS by establishing and managing the traffic path to reduce network load and congestion while providing the P2P service.

8. A method of operating a mobile station (MS) for receiving a peer-to-peer (P2P) service in a wireless communication system, the method comprising:
  transmitting a P2P service request signal comprising information of contents and information of preferred peer MSs of the MS to a server;
  receiving information of a peer MS capable of providing the contents from the server, wherein the peer MS is selected from a list of MSs having the contents based on a distance between the peer MS and the MS and based on an available resource status of at least two serving base stations (BSs) of the MSs on the list and based on the information of preferred peer MSs of the MS;
  requesting the selected peer MS to provide the contents;
  receiving, from the selected peer MS, a response signal corresponding to the request to provide the contents;
  when the response signal includes a rejection of the request, transmitting a signal for another peer MS selection to the server, and
  when the response signal includes an acceptance of the request, receiving the contents from the selected peer MS in a traffic path established by the server.

9. The method of claim 8, wherein the receiving information of a peer MS capable of providing the contents from the server comprising:
  receiving a P2P service response signal comprising IP address of the peer MS and traffic classification information,
  wherein the traffic classification information comprises at least one of source a IP address, a destination IP addresses, a source port address, a destination port addresses, and a protocol.

10. The method of claim 8, wherein the traffic path between the MS and the peer MS is established and managed to reduce network load and congestion while the P2P service is provided.

11. The method of claim 8, wherein:
  a traffic path between the MS and the peer MS is determined based on a serving BS identifier of the MS and a serving BS identifier of the peer MS, the traffic path comprises only the serving base station of the MS, if the serving BS identifier of the MS is identical with the serving BS identifier of the peer MS, and the traffic path comprises at least one of a gateway of the MS and a gateway of the peer MS, if the serving BS identifier of the MS is not identical with the serving BS identifier of the peer MS.

12. An apparatus of a server for providing a peer-to-peer (P2P) service in a wireless communication system, the apparatus comprising:

a transceiver configured to process signal transmission and reception; and a controller configured to:
control to receive a P2P service request signal comprising information of contents requested by a mobile station (MS) and information of preferred peer MSs of the MS;
select a peer MS from a list of MSs having the contents based on a distance between the peer MS and the MS and based on an available resource status of at least two serving base stations (BSs) of the MSs on the list and based on the information of the preferred peer MSs of the MS;
transmit information of the selected peer MS to the MS;
receive, from the MS, a signal for another peer MS selection when the MS receives a response signal including a rejection of the P2P service from the selected peer MS;
select another peer MS from the list of MSs having the contents; and
transmit information of the another peer MS to the MS.

13. The apparatus of claim 12, wherein the controller is further configured to compare the network node of the MS with the network node of each of a plurality of MSs included in the list of MSs; and select the peer MS belonging in the network node that are identical with the network node of the MS among the plurality of MSs based on the comparison,
wherein the network node includes at least one of the serving BSs and an access service network gateway (ASN GW),
wherein the distance between the MS and the peer MS is determined based on a network node of the MS and a network node of the peer MS.

14. The apparatus of claim 12, wherein the controller is further configured to request the list of MSs capable of providing the P2P service to the MS, to a gateway corresponding to the MS, and control to receive the list of MSs capable of providing the P2P service to the MS from the gateway.

15. The apparatus of claim 12, wherein the controller is further configured to determine a traffic path based on a serving BS identifier of the MS and the serving BS identifier of the peer MS, and receive a traffic path establishment request message to a node corresponding to the traffic path,
wherein the traffic path establishment request message comprises at least one of the serving BS identifier of the MS, an IP address of a serving BS of the MS, the serving BS identifier of the peer MS, an IP address of a serving BS of the peer MS, and traffic classification information of the traffic path,
wherein the traffic classification information comprises at least one of source a IP address, a destination IP addresses, a source port address, a destination port addresses, and a protocol.

16. The apparatus of claim 15, wherein the node corresponding to the determined traffic path comprises only the serving BS of the MS, if the serving BS identifier of the MS is identical with the serving BS identifier of the peer MS; and
the node corresponding to the determined traffic path comprises at least one of a gateway of the MS and a gateway of the peer MS, if the serving BS identifier of the MS is not identical with the serving BS identifier of the peer MS.

17. The apparatus of claim 12, wherein the controller is further configured to transmit at least one of an MS identifier and serving BS identifier of the MS to an authentication authorization accounting (AAA); and receive information of an ASN-GW corresponding to the MS from the AAA.

18. The apparatus of claim 12, wherein the controller is configured to establish and managed the traffic path between the MS and the peer MS to reduce network load and congestion while providing the P2P service.

19. An apparatus of a mobile station (MS) for receiving a peer-to-peer (P2P) service in a wireless communication system, the apparatus comprising:

a transceiver configured to transmit and receive a signal; and a controller configured to:
control to transmit a P2P service request signal comprising information of contents and information of preferred peer MSs of the MS to a server;
receive information of a peer MS capable of providing the contents from the server, wherein the peer MS is selected from a list of MSs having the contents based on a distance between the peer MS and the MS and based on an available resource status of at least two serving base stations (BSs) of the MSs on the list and based on the information of preferred peer MSs of the MS;
request the selected peer MS to provide the contents;
receive, from the selected peer MS, a response signal corresponding to the request to provide the contents;
when the response signal includes a rejection of the request, transmit a signal for another peer MS selection to the server, and
when the response signal includes an acceptance of the request, receive the contents from the peer MS in a traffic path established by the server.

20. The apparatus of claim 19, wherein the controller is further configured to receive a P2P service response signal comprising IP address of the peer MS and traffic classification information,
wherein the traffic classification information comprises at least one of source a IP address, a destination IP addresses, a source port address, a destination port addresses, and a protocol.

21. The apparatus of claim 19, wherein the traffic path between the MS and the peer MS is established and managed to reduce network load and congestion while the P2P service is provided.

22. The apparatus of claim 19, wherein:
a traffic path between the MS and the peer MS is determined based on a serving BS identifier of the MS and a serving BS identifier of the peer MS,
the traffic path comprises only the serving BS of the MS, if the serving BS identifier of the MS is identical with the serving BS identifier of the peer MS, and
the traffic path comprises at least one of a gateway of the MS and a gateway of the peer MS, if the serving BS identifier of the MS is not identical with the serving BS identifier of the peer MS.

* * * * *